(12) United States Patent
Nakano et al.

(10) Patent No.: US 6,430,926 B1
(45) Date of Patent: Aug. 13, 2002

(54) BRAKE MASTER CYLINDER

(75) Inventors: Toshihiro Nakano, Chiryu; Kaoru Tsubouchi, Toyota; Akimoto Okada, Anjo, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/709,374

(22) Filed: Nov. 13, 2000

(30) Foreign Application Priority Data

| Nov. 10, 1999 | (JP) | 11-320228 |
| Nov. 11, 1999 | (JP) | 11-320631 |
| Nov. 12, 1999 | (JP) | 11-322394 |
| Nov. 12, 1999 | (JP) | 11-322396 |

(51) Int. Cl.$^7$ .............................. B60T 11/20; F15B 7/08
(52) U.S. Cl. ................................. 60/562; 60/588
(58) Field of Search ......................... 60/562, 588; 92/86

(56) References Cited

U.S. PATENT DOCUMENTS

| 5,187,934 A | * | 2/1993 | Mori ........................... 60/562 |
| 5,431,014 A | | 7/1995 | Ishihara |

FOREIGN PATENT DOCUMENTS

| JP | 6-298072 | 10/1994 |
| JP | 8-1997 | 1/1996 |
| JP | 2560091 | 10/1997 |
| JP | 11-198794 | 7/1999 |

* cited by examiner

Primary Examiner—Edward K. Look
Assistant Examiner—Michael Leslie
(74) Attorney, Agent, or Firm—Burns, Doane, Swecker & Mathis, LLP

(57) ABSTRACT

A brake master cylinder for a vehicle brake system in which the assembling precision of a guide and a cup seal, the structure of a communication conduit, and the structure of a cylinder cap and the guide are improved to thereby improve the performance of the brake master cylinder while also reducing the cost and improving the sealing structure between a body and the cylinder cap to thus reduce the size of the cylinder cap. The brake master cylinder includes the cylinder cap positioned in an internal bore opening portion of the body, a first piston inserted into a cylinder housing through the cylinder cap and slidably supported by the guide in the axial direction, a second piston positioned coaxially with the first piston at the front of the first piston and slidable in the axial direction in the cylinder housing, and a cup seal at the front of the guide for liquid-tightly sealing a first pressure chamber formed between the first piston and the second piston. The guide and the cup seal coaxially engage the inner bore of the cylinder cap.

17 Claims, 3 Drawing Sheets

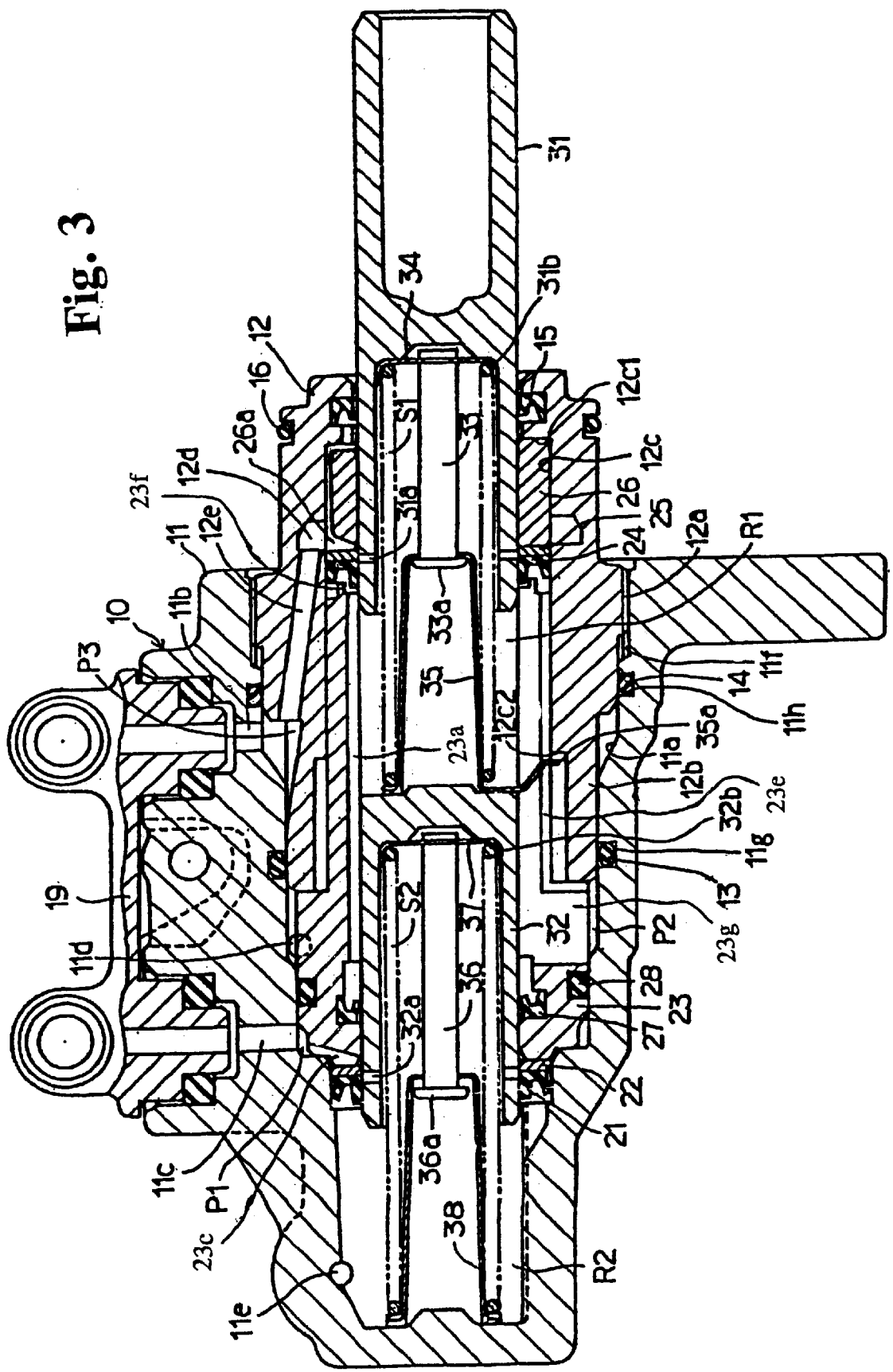

BRAKE MASTER CYLINDER

This application is based on and claims priority under 35 U.S.C. §119 with respect to Japanese Application No. 11(1999)-320228 filed on Nov. 10, 1999, Japanese Application No. 11(1999)-320631 filed on Nov. 11, 1999, Japanese Application No. 11(1999)-322394 filed on Nov. 12, 1999 and Japanese Application No. 11(1999)-322396 filed on Nov. 12, 1999, the entire content of all of which is incorporated herein by reference.

FIELD OF THE INVENTION

This invention generally relates to vehicle brake systems. More particularly, the present invention pertains to a brake master cylinder for a vehicle brake system.

BACKGROUND OF THE INVENTION

Japanese Utility Model Publication No. 8(1996)-1997 describes a brake master cylinder that includes a body having an internal bore opening at a rear end, a cylinder cap assembled at an internal bore opening portion of the body and forming a cylinder housing with the body, a first piston positioned in the cylinder housing through the cylinder cap and slidably supported in the axial direction by a first cylindrical guide assembled in the cylinder cap, a second piston positioned coaxially with the first piston at the front of the first piston and axially slidable in the cylinder housing, and a cup seal sealing in a liquid-tight manner a first pressure chamber formed between the first piston and the second piston at the front of the guide (tandem type master cylinder).

The first guide slidably supporting the first piston in the axial direction is coaxially engaged with the internal bore of the cylinder cap, a sleeve slidably supporting the first piston and the second piston in the axial direction at the front of the first guide is coaxially engaged with the internal bore of the cylinder cap, and the cup seal liquid-tightly sealing the first pressure chamber formed between the first piston and the second piston at the front of the guide is coaxially engaged with an internal bore provided at a rear end of the sleeve. The sleeve is disposed in the cylinder cap via the first guide at the rear end, and is disposed in the body via a second guide slidably supporting the second piston in the axial direction at the front end. The sleeve is supported along with both guides by the body and the cylinder cap, and the cylinder cap is fixed to the body by a screw connection.

Japanese Patent Laid-Open Publication No. H11-198794 discloses a brake master cylinder in which a guide (piston guide portion) slidably supporting a first piston in the axial direction at the rear of a cup seal is provided in one unit with an inner peripheral portion of a cylinder cap, and a first communication conduit (a conduit communicating with a piston part at a retracted position of the first piston) is provided on an inner peripheral portion of the guide. The first communication conduit is structured with a straight internal bore formed at the front inner periphery of the guide and a tapered internal bore wherein a diameter thereof is gradually enlarged from the rear end of the straight bore in the rear direction of the straight internal bore.

A second communication conduit (a conduit communicating the first communication conduit and an annular conduit formed on the body and the cylinder cap) provided on the cylinder cap is constructed with a first communication bore opening to the outer periphery surface of the cylinder cap, communicating with the annular conduit, and extending straight towards the inner periphery at a predetermined tilt angle relative to the central axis of a first piston and a second communication bore communicating by opening to the middle of the tapered internal bore of the first communication conduit. The second communication bore communicates with the first communication bore by extending straight towards the outer periphery with a tilt angle larger than that of the first communication bore.

In this brake master cylinder disclosed in Japanese Patent Laid-Open Publication No. H06-298072, a first seal member (O-ring) blocking the communication between an annular conduit and the atmosphere at the rear of the annular conduit is assembled at a first annular groove provided on the outer periphery of the cylinder cap. A second seal member (an O-ring whose diameter is smaller than that of the first seal member) is positioned at a second annular groove provided on the outer periphery of the cylinder cap.

The Japanese Utility Model Application published as Jitsu-kai-hei 5(1993)-80945 discloses a brake master cylinder in which an annular seal member is assembled at an annular recess portion provided on a cylinder cap at the rear of a guide. The seal member provides an air-tight and liquid-tight seal between the cylinder cap and a first piston. The recess portion of the cylinder cap is open to the front (open to both the front and rear), is in communication with an accommodation bore accommodating the guide, and is in communication with a second communication conduit provided with the cylinder cap via a communication groove formed on the rear end face of the guide with a fluid chamber formed with the seal member at the rear of the guide.

In the brake master cylinder described in the Japanese Utility Model Publication published as Jitsu-kai-hei 8(1996)-1997, the guide slidably supporting the first piston in the axial direction is coaxially engaged with the internal bore of the cylinder cap and the cup seal liquid-tightly sealing the first pressure chamber formed between the first piston and the second piston at the front of the guide is coaxially engaged with the internal bore of the sleeve coaxially engaged with the internal bore of the cylinder cap. Accordingly, it is difficult to improve the assembling precision of the guide and the cup seal and the cocentricity of the cup seal and the first piston supported by the guide.

Because the sleeve is inserted into and supported by the body, and the cylinder cap is connected to the body with screws along with both guides, the axial length of the sleeve and both guides should be designed to have sufficient length. Accordingly, the expanding and contracting amount of the sleeve and both guides that is generated due to the change of the surrounding temperature becomes large, and a looseness at the screw connecting portion of the body and the cylinder cap may be generated. When the cylinder cap is excessively tightened to prevent the generation of the looseness of the screw connecting portion, excessive load is added to the entire sleeve and both guides. As a result, a material possessing high durability is required to be adopted for the sleeve and both guides. This increases the manufacturing cost and may interfere with the assembling precision of the cup seal by deformation of the internal bore provided at the rear end of the sleeve in which the cup seal is disposed.

In the brake master cylinder described in Japanese Patent Laid-Open Publication No. H11-198794, because the second communication conduit is structured with the first communication bore and the second communication bore, and the second communication bore opens in the middle of the tapered internal bore, brake fluid flow from the reservoir to the first communication conduit via the reservoir connecting point and the annular conduit flows into this first pressure chamber through the first communication bore and the second communication bore of the second communication conduit and the small diameter portion of the tapered internal bore and the straight internal bore of the first communication conduit. Accordingly, brake fluid does not flow appropriately into a large diameter portion of the tapered internal bore wherein the air left in the large diameter portion of the tapered internal bore cannot be appropriately relieved and so air remains in the large diameter portion.

In the brake master cylinder disclosed in Japanese Patent Laid-Open Publication No. H11-198794 in which a bypass conduit opens to the large diameter portion of the tapered internal bore at the rear end and opens to a back face of the cup seal at the front end, when negative pressure is generated in the first pressure chamber the remaining air in the large diameter portion of the tapered internal bore is relieved to the first pressure chamber along with the accompanying brake fluid to supply the brake fluid from the reservoir to the large diameter portion of the tapered internal bore into the first pressure chamber via a lip portion of the cup seal and the bypass conduit. However, the structure of the first communication conduit and the second communication conduit is still susceptible of improvement.

The first communication bore and the second communication bore included in the second communication conduit are easily processed or produced by drill processing. However, in order to accurately connect and provide communication between the first communication bore and the second communication bore by aligning the rear end (internal end) of the first communication bore with the front end (external end) of the second communication bore, the drill processing position of the first communication bore and the second communication bore need to be aligned. This requires relatively high processing precision and can lead to an increase in the manufacturing cost.

In the master cylinder described in Japanese Patent Laid-Open Publication No. H06-298072, because the tilted communication bore constructed as a part of the second communication conduit is provided at the inner peripheral side compared to the first annular groove and it is necessary to ensure sufficient thickness between the tilted communication bore and the first annular groove, the size of the outer diameter of the cylinder cap is enlarged, thus enlarging the body. This presents an obstacle to reducing the size and weight of the brake master cylinder.

Considering the cylinder cap of the brake master cylinder described in Japanese Patent Laid-Open Publication No. H06-298072, each seal member assembled to each annular groove of the cylinder cap moves forward during slidable rotational contact of the inner periphery of the internal bore of the body with the outer periphery of the seal. Accordingly, each seal member may be bent or twisted to deteriorate the sealing function. Also, the diameter of the first seal member is larger than that of the second seal member and the probability that the first seal member is bent is higher than the second seal member.

In the brake master cylinder described in the Japanese Utility Model Application published as Jitsu-kai-hei 5(1993)-80945, the load according to the pressure of the first pressure chamber acts on the guide and is accepted by the cylinder cap after acting from the rear end of the guide to the cylinder cap. The rear end of the guide contacts the cylinder cap at the annular portion between the outer diameter of the guide and the outer diameter of the recess portion provided on the cylinder cap. When the seal member with a large diameter is adopted, the outer diameter of the recess portion is enlarged. It may thus not be possible to ensure the contacting area (load receiving portion area) between the rear end of the guide and the cylinder cap. In this case, the guide receiving an excess load may damage the rear end of the guide due to an excessive compression at the contact portion with the cylinder cap and may deform and damage the inner periphery portion of the guide to the recess portion of the cylinder cap. The damage on the guide can be prevented by strengthening the guide itself. However, utilizing materials having the necessary high strength undesirably increases the manufacturing cost.

Accordingly, a need exists for an improved brake master cylinder which overcomes at least the above-noted drawbacks.

A need also exists for a brake master cylinder having improved performance and reduced manufacturing cost.

SUMMARY OF THE INVENTION

In the brake master cylinder of the present invention, the guide member is coaxially engaged with the internal bore of the cylinder cap and the cup seal is coaxially engaged with the internal bore of the cylinder cap. Because the guide and the cup seal are coaxially engaged with the internal bore of the cylinder cap, the assembling precision of the guide and the cup seal and the concentricity of the cup seal and the first piston supported by the guide can be easily improved and the sealing effects between the first piston and the cup seal can also be improved. More particularly, upon assembly, the bore diameters of the guide and the cup seal at the internal bore of the cylinder cap are identical or the same, and so the bore processing of the cylinder cap is easily carried out and the assembly error of the guide and the cup seal into the cylinder cap internal bore can be reduced to improve the concentricity of the first piston and the cup seal.

Another aspect of the present invention involves the brake master cylinder being designed so that at least a part of the sleeve slidably supporting the first piston and the second piston in the axial direction is coaxially engaged with the internal bore of the cylinder cap at a front of the guide and the cup seal. When at least a part of the sleeve slidably supporting the first piston and the second piston in the axial direction is coaxially engaged with the internal bore of the cylinder cap at the front of the guide and the cup seal, the assembly precision with respect to the guide, the cup seal, and the sleeve can be easily improved to also easily improve the sliding performance of the first piston supported by the guide and the sleeve.

Another aspect of the present invention involves the sleeve being provided with a stepped portion at the middle portion of its outer periphery so that a small diameter portion is coaxially inserted into the internal bore of the cylinder cap and a large diameter portion is supported by the body and the cylinder cap by a screw connection between the body and the cylinder cap. Because the sleeve is coaxially engaged with the internal bore of the cylinder cap at the small diameter cylindrical portion, the assembling precision with respect to the guide, the cup seal, and the sleeve can be easily improved to improve the sliding performance of the first piston supported by the guide and the sleeve.

Because the large diameter cylindrical portion of the sleeve is inserted into the body and supported by the body and the cylinder cap, when the axial length of the sleeve changes due to a change in the surrounding temperature, the length change does not entirely influence the screw connected portion of the body and the cylinder cap and effectively inhibits or prevents looseness at the screw connected portion. Because the guide and the small diameter cylindrical portion are not connected, when the cylinder cap is excessively tightened, the excessive load is not added to the guide and the small diameter cylindrical portion of the sleeve (the portion with less durability of the sleeve). This makes it possible to use a reasonable material with less durability for the sleeve and the guide, which reduces the manufacturing cost.

A still further aspect of the invention involves the first communication conduit provided adjacent the rear of the cup seal and a second communication conduit provided on the cylinder cap. The second communication conduit includes an annular groove having an outer diameter larger than that of the cup seal that is formed adjacent the back face of the cup seal, opens towards the inner periphery of the cylinder cap, and is in communication with the first communication conduit and a communication bore drilled from the outer periphery of the cylinder cap to the front outer periphery portion of the annular groove, communicating with the annular groove and the reservoir connecting port, and inclined upwardly towards the reservoir connecting port. Because the first communication conduit is provided adjacent the rear of the cup seal and the second communication conduit comprises the annular groove and the communication bore, the brake fluid flows towards the first pressure chamber through the first communication conduit provided adjacent the back of the cup seal, the annular groove and the communication bore of the second communication conduit during the air relieving operation at installment of the brake master cylinder to the vehicle body.

Because the annular groove of the second conduit includes a larger outer periphery than that of the cup seal, opens to the inner periphery of the cylinder cap and communicates with the first communication conduit, and the communication bore of the second communication conduit is drilled from the outer periphery of the cylinder cap to the front outer portion of the annular groove, the brake fluid smoothly and appropriately flows through the first communication conduit and the second communication conduit during the air relieving operation. Accordingly, remaining air in the first communication conduit and the second communication conduit is appropriately relieved.

The upward inclination of the communication bore of the second communication conduit towards the annular conduit (the conduit communicating with the reservoir connecting port provided at the upper portion of the body), even when air is mixed into the brake fluid of the first communication conduit and the second communication conduit, the air reaches the annular conduit from the first communication conduit through the annular groove and the communication bore of the second communication conduit by buoyancy, is discharged to the reservoir from the annular conduit through the reservoir connecting port, and does not remain in the brake master cylinder. Accordingly, favorable performance of the brake master cylinder is maintained.

The second communication conduit includes the annular groove which is easily processed by lathe processing and the communication bore which is easily professed by drill processing formed. Because the communication bore is drilled towards the front outer periphery portion of the annular groove, processing precision in the peripheral direction is not required and this reduces the manufacturing cost.

Another aspect of the brake master cylinder of the present invention involves the first communication conduit including a communication groove provided at the front end portion of the guide slidably supporting the first piston assembled to the back portion of the cup seal in the axial direction. Because the communication groove can be formed in one unit with the guide, the guide is made of plastic material separately from the cylinder cap, which reduces the manufacturing cost.

The length of the first communication conduit, that is the length from the portion communicating with the second communication conduit of the communication groove provided at the front end of the guide to the back of the cup seal, can be shortened. Accordingly, the suction characteristic of the brake fluid to the first pressure chamber (the performance when the brake fluid is supplemented to the first pressure chamber through a lip portion of the cup seal) when the negative pressure is generated in the first pressure chamber by a sudden return of the first piston to the retracted position can be greatly improved and the performance of the brake master cylinder is accordingly improved.

In the brake master cylinder of the present invention, the first annular groove is tapered at the outer periphery gradually increasing in diameter in the forward direction. Because the first annular groove is tapered at the outer periphery in a manner gradually increasing in diameter in the forward direction, the tapered outer peripheral wall of the annular groove can properly introduce fluid therein, the flow of the brake fluid from the communication bore of the second communication conduit to the first communication conduit and the relief of air from the annular groove of the first communication conduit and the second communication conduit to the communication bore of the second communication conduit can be improved.

Another aspect of the brake master cylinder of the present invention includes an annular conduit formed between the cylinder cap and the body, positioned between the second communication conduit and the reservoir connecting port, and communicating the second communication conduit and in the reservoir connecting port. Because the brake master cylinder includes the annular conduit formed between the cylinder cap and the body, positioned between the second communication conduit and the reservoir connecting port, and communicating the second communication conduit and the reservoir connecting port, the second communication conduit provided on the cylinder cap and the reservoir connecting port provided on the body can be communicated easily and accurately by the annular conduit formed between the cylinder cap and the body.

In the present invention, the body and the cylinder cap are sealed by a first seal member assembled in a first annular groove provided on the body at the rear of the reservoir connecting port to block communication between the second communication conduit and the atmosphere. The outer diameter of the cylinder cap can thus be smaller to reduce the size and weight of the body and the brake master cylinder.

When the cylinder cap is connected to the body with screws, because the outer periphery of the first seal member assembled to the first annular groove of the body contacts the body on the fixed side, even when the first seal member receives the sliding rotation of the cylinder cap contacting the outer periphery of the cylinder cap at the inner periphery thereof, it is hard to be bent due to the stronger fixing force by the body than the rotation force of the cylinder cap, which reduces the deterioration of the sealing function. Consequently, the cross-sectional area of the seal member (effective diameter of the O-ring) can be reduced to reduce the manufacturing cost of the seal member and reduce the size of the brake master cylinder.

The body and the cylinder cap are sealed by a second seal member assembled in a second annular groove provided on the body at the front of the reservoir connecting port to block communication between the first pressure chamber and the reservoir connecting part. Thus, when the cylinder cap is connected to the body with screws, the first seal member and the second seal member are difficult to bend and the deterioration of the seal function is reduced. Accordingly, the cross-sectional area (effective diameter of the O-ring) of both seal members can be reduced to reduce the manufacturing costs of the both seal members and the size of the brake master cylinder. When assembling the cylinder cap to the body, since the both seal members provided between the cylinder cap and the body are difficult to bend against the fast rotation of the cylinder cap, it is not necessary to assemble the cylinder cap to the body by slowly rotating the cylinder cap, which shortens the assembling time of the cylinder cap to the body to improve productivity.

An annular conduit is formed between the cylinder cap and the body, and is positioned between the reservoir connecting port and the second communication conduit to communicate the second communication conduit and the reservoir connecting port. The second communication conduit provided on the cylinder cap and the reservoir connecting port provided on the body are thus easily and appropriately communicated.

The brake master cylinder also includes a flange portion restricting the retracting movement of the guide by contact with the rear end of the guide and by extending radially inwardly compared to the outer diameter of the seal member. When a first piston is pushed in the axially forward direction under the condition in which the brake master cylinder is assembled to the vehicle body and the brake fluid is filled in the cylinder housing, a piston port of the first piston passes through or is blocked by the cup seal to block communication between a first pressure chamber and a reservoir connecting port to generate pressure in the first pressure chamber. In this case, a load by the pressure of the first pressure chamber affects the guide, retraction of the guide is restricted by the flange portion of the cylinder cap, and the load affects the flange portion of the cylinder cap from the rear end of the guide to be received by the cylinder cap.

The flange portion of the cylinder cap at the rear of the guide extends radially inwardly compared to the outer diameter of the annular seal member that air-tightly and liquid-tightly seals the cylinder cap and the first piston, and is capable of ensuring sufficient contacting area with the rear end of the guide. Accordingly, excessive compression of the rear end of the guide and excessive deformation of the inner peripheral portion of the guide are prevented to ensure the integrity and intensity of the guide, to enable the use of reasonable material with less strength for the guide, and to reduce the manufacturing cost.

The brake master cylinder also includes the annular flange portion having a larger inner diameter than that of the guide. Thus, the contact between the inner periphery of the flange portion and the outer periphery of the first piston can be avoided. Accordingly, the inner periphery of the flange portion does not necessarily need to be processed (i.e., it does not require surface treatment against the abrasion caused by the sliding piston and the high precision bore processing) to reduce the manufacturing cost.

A third conduit is provided at the flange portion at the rear side thereof and is in fluid communication with a fluid chamber provided in the second cup seal, and a fourth conduit is provided in the guide member for connecting the third conduit with the first conduit. Because the third conduit is in fluid communication with a fluid chamber provided in the second cup seal and the fourth conduit is provided in the guide member for connecting the third conduit with the first conduit, air remaining in the upper portion of the fluid chamber formed with the seal member can be relieved to the first communication conduit through the third communication conduit and the fourth communication conduit.

The fourth conduit is formed by molding at the outer periphery and the rear end surface of the guide member. The fourth communication conduit can thus be easily and reasonably formed compared to machining the guide through bore processing, which reduces the manufacturing cost.

The guide used in the present invention is made of plastic material. The first communication conduit and the fourth communication conduit can thus be formed simultaneously, and by properly selecting the plastic material the surface treating against the abrasion caused by sliding piston is not necessary. This thus also reduces the manufacturing cost.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 3 is a cross-sectional view illustrating a second embodiment of the brake master cylinder of the present invention.

DETAILED DESCRIPTION OF THE INVENTION

Figure 1:
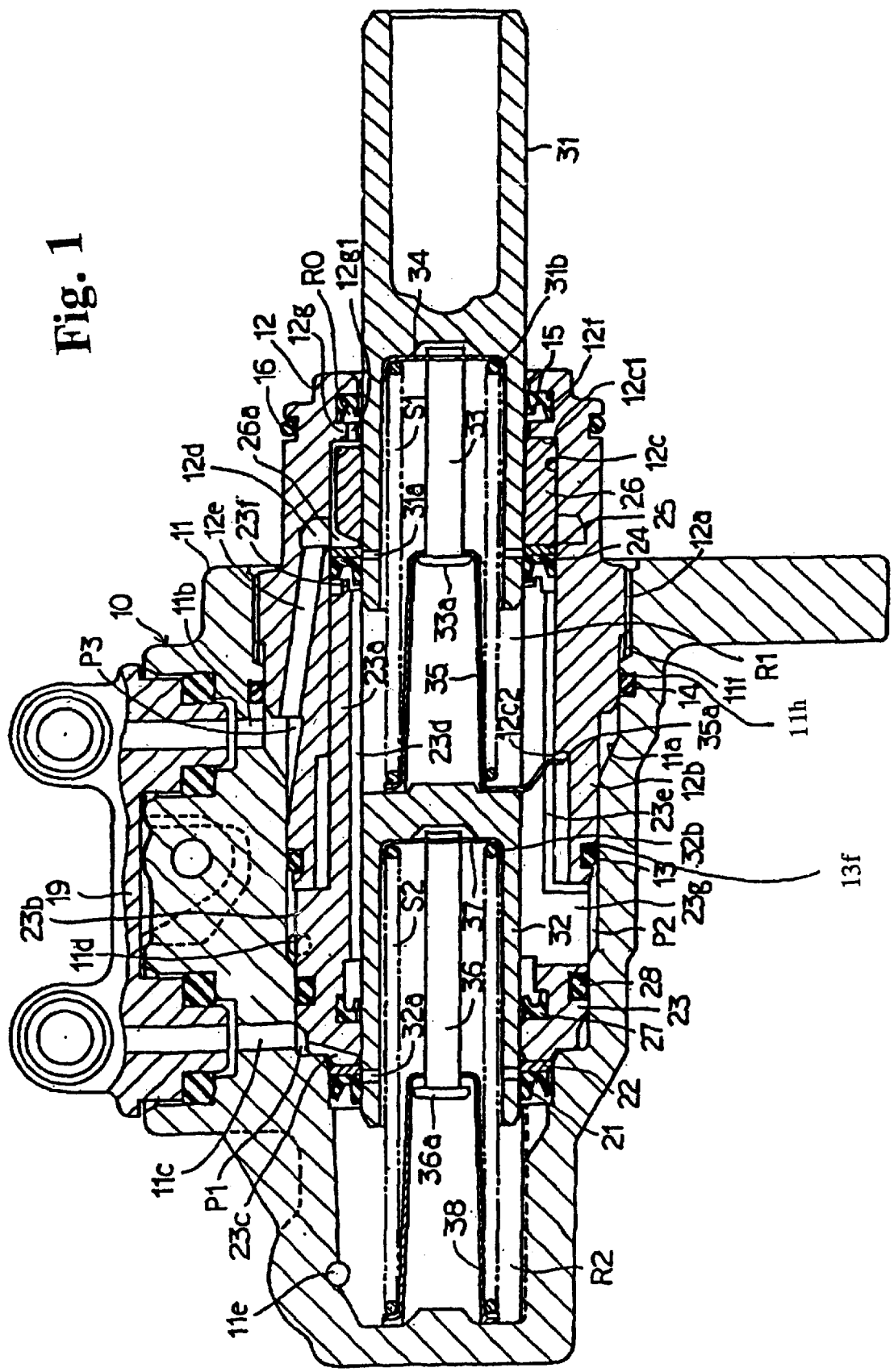
FIG. 1 is a cross-sectional view illustrating a first embodiment of a brake master cylinder of the present invention.

Referring initially to FIG. 1, the brake master cylinder of the present invention includes a cylinder housing 10 defined by a body 11 and a cylinder cap 12, annular first cup seal 21, an annular first spacer 22, a sleeve 23, an annular second cup seal 24, an annular second spacer 25, and a guide 26 which are disposed in the cylinder housing 10. In addition, the brake master cylinder includes a first piston 31 and a second piston 32.

The body 11 is made of metal and includes a stepped internal bore 11a opening to the rear (i.e., the right end in FIG. 1), two reservoir connecting ports 11b, 11c connected to a reservoir (not shown) via a connector 19, and output ports 11d, 11e each connected to each wheel cylinder (not shown) via a hydraulic brake circuit. An internal screw portion 11f is formed on the internal bore 11a. The annular first cup seal 21 and the first spacer 22 are coaxially engaged with each other and assembled at the internal bore of the body 11. The first cup seal 21 is positioned between the body 11 and the second piston 32 and provides a liquid-tight seal for a second pressure chamber R2 that is in communication with the output port 11e. The annular first spacer 22 is positioned between the first cup seal 21 and the sleeve 23 and allows fluid flow in the axial direction at the inner and outer periphery and prevents a part of the first cup seal 21 from cutting into a communication groove 23c of the sleeve 23 when pressure is generated in the second pressure chamber R2.

The cylinder cap 12 includes an external screw 12a that threadably engages the internal screw 11f of the body 11 and a cylindrical portion 12b engaged with the internal bore 11a of the body 11 and accommodating a small diameter cylindrical portion 23a of the sleeve 23. The cylinder cap 12 is assembled in a liquid-tight manner to the body 11 via O-rings 13, 14. The cylinder cap 12 also fastens the first cup seal 21, the first spacer 22, and the sleeve 23 coaxially so as to be engaged with the internal bore 11a of the body 11 at the end face of the cylindrical portion 12b, and fastens the annular second cup seal 24, the second spacer 25, and the guide 26 coaxially so as to be engaged with a stepped internal bore 12c of the cylinder cap 12 at the right end stepped portion 12d of the stepped internal bore 12c. The annular second spacer 25 provided between the second cup seal 24 and the guide 26 allows fluid flow in the axial direction at both the inter and outer peripheries and prevents a part of the second cup seal 24 from cutting into a communication groove 26a of the guide 26 when pressure is generated in a first pressure chamber R1.

An annular cup seal 15 is assembled to the inner periphery of the right end portion of the cylinder cap 12. An O-ring 16 is positioned on the outer periphery of the right end portion of the cylinder cap 12. The O-ring 13 is positioned in an annular groove 13f provided on the outer periphery of the cylinder cap 12 to provide a liquid-tight and air-tight seal between the body 11 and the cylinder cap 12. The O-ring 14 is positioned in an annular groove 11h provided on the internal bore 11a of the body 11 at a position rearward of the O-ring 13 to provide an air-tight and liquid-tight seal between the body 11 and the cylinder cap 12.

The cup seal 15 is disposed in an annular recess portion 12f provided on the cylinder cap 12 at a position rearward of the guide 26 to provide an air-tight and liquid-tight seal between the body 11 and the cylinder cap 12. The O-ring 16 located in the annular groove provided on the outer periphery of the cylinder cap 12 provides an air-tight and liquid-tight seal between a housing (not shown) of a brake booster and the cylinder cap 12.

The outer periphery on the right end (i.e., rear end) of the cylinder cap 12 possesses a hexagonal shape. By rotating the hexagonal portion with a tool, the cylinder cap 12 can be assembled to and disassembled from the body 11.

The resin made cylindrical sleeve 23 has a stepped portion at the middle portion on the outer periphery and includes the small diameter cylindrical portion 23a at the rear side and a large diameter cylinder portion 23b at the forward side. The sleeve 23 is coaxially engaged with the stepped internal bore 12c of the cylinder cap 12 at the small diameter cylindrical portion 23a, and is positioned in the body and supported by the internal bore stepped portion of the body 11 and the end face of the cylindrical portion 12b of the cylinder cap 12 at the large diameter cylindrical portion 23b. An annular cup seal 27 is positioned at the inner periphery of the large diameter cylindrical portion 23b and an O-ring 28 is located on the outer periphery of the large diameter cylindrical portion 23b of the sleeve 23. The cup seal 27 provides a liquid-tight seal between the sleeve 23 and the second piston 32, while the O-ring 28 provides a liquid-tight seal between the sleeve 23 and the body 11.

The sleeve 23 includes communication grooves 23c, 23d, 23e, a projection 23f, and an opening portion 23g. A plurality of the communication grooves 23c are formed so as to be inclined towards the large diameter left end portion of the sleeve 23 and are positioned at a predetermined interval in the peripheral direction. The grooves 23c are always in communication with the reservoir connecting port 11c via an annular conduit P1 formed between the body 11 and the sleeve 23, and are in communication with a piston port 32a provided on a second piston 32 via a gap between the first spacer 22 and the second piston 32.

A plurality of the communication grooves 23d are provided at a predetermined interval in the peripheral direction in a direction straight along the axial direction on the inner periphery of the sleeve 23. The grooves 23d always communicate the first pressure chamber R1 formed between the first piston 31 and the second piston 32 and cylindrical cup portions of each second cup seal 24, 27. A plurality of L-shaped communication grooves 23e are formed in the axial direction on the outer periphery of the small diameter cylindrical portion 23a of the sleeve 23 and along the radial direction on the outer peripheral stepped portion of the sleeve 23. The communication groove 23e is always in communication with the output port 11d via an annular conduit P2 formed between the body 11 and the sleeve 23 on one end, and with the cylindrical cap recess portion of the second cup seal 24 on the other end.

The projection 23f of the sleeve 23 is formed on the small diameter right end portion of the sleeve 23. The projection 23f projects in the axial direction and is positioned in the cylindrical cap recess portion of the second cup seal 24.

The opening portion 23g of the sleeve 23 is formed along the entire portion of the small diameter cylindrical portion 23a of the sleeve 23. A part of the large cylindrical portion 23b of the sleeve 23 extends in the axial direction, always communicates the first pressure chamber RI to the output port 11d by opening in the radial direction, and opens to the axial direction at the small diameter right end portion (i.e., the first piston 31 side end portion).

The guide 26 is made of phenolic resin and is cylindrically shaped, and engages the stepped internal bore 12c of the cylinder cap 12. The movement of the guide 26 in the rearward direction (i.e., to the right in FIG. 1) is restricted by the contact with a flange portion 12g provided between the cup seal 15 and the guide 26. The flange portion 12g is formed integrally as one unit with the cylinder cap 12 and extends radially inwardly of the outer periphery of the cup seal 15. The inner diameter of the flange portion 12g is slightly larger than that of the guide 26. The end portion of the flange portion 12g is provided with a recessed portion 12g1. This recessed portion 12g1 is in communication with an upper portion of a fluid chamber Ro formed with the cup seal 15 at the rear portion of the flange portion 12g.

Figure 2:
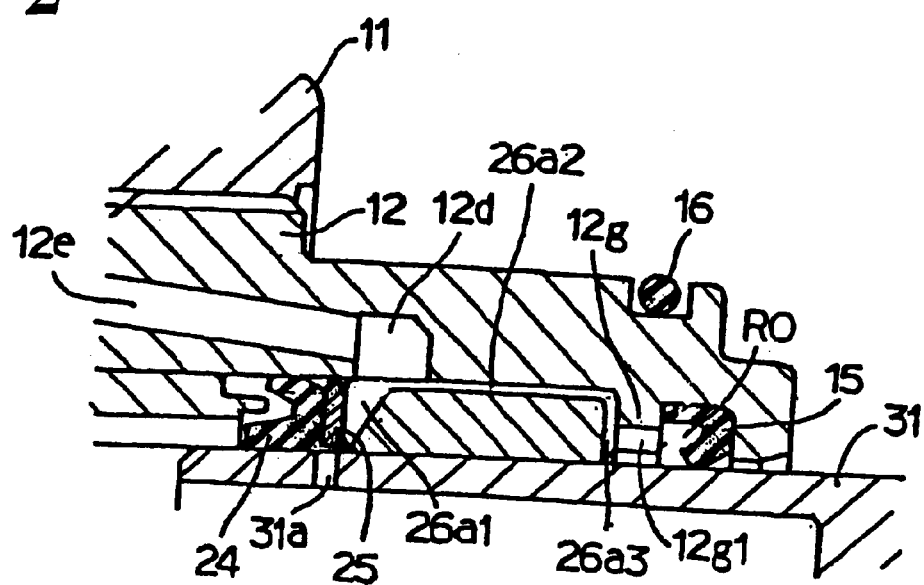
FIG. 2 is an enlarged cross-sectional view of a portion of the brake master cylinder shown in FIG. 1.

A U-shaped communication groove 26a extending along the outer periphery to both end faces is formed on the guide 26 by molding. Referring to FIG. 2, a plurality of communication grooves 26a which include a front groove portion 26a1 formed along the radial direction at a front end face of the guide 26, an outer periphery groove portion 26a2 formed along the axial direction on the outer periphery of the guide 26, and a rear groove portion 26a3 formed along the radial direction at the rear end face of the guide 26, are provided at predetermined intervals in the peripheral direction.

The front groove portion 26a1 of the communication groove 26a provided rearwardly of and adjacent to the second cup seal 24 forms a first communication conduit with the second spacer 25 and is always in communication with the reservoir connecting port 11b via a second communication conduit comprising an annular groove 12d and a communication bore 12e (a plurality of such conduits are provided at predetermined intervals in the peripheral direction) formed on the cylinder cap 12 at the outer peripheral side and an annular conduit P3 formed between the body 11 and the cylinder cap 12 at the outer peripheral side. The front groove portion 26a1 of the communication groove 26a is also in communication with a piston port 31a provided on the first piston 31 through a gap between the second spacer 25 and the first piston 31 at the inner peripheral side.

The outer peripheral groove portion 26a2 of the communication groove 26a forms a fourth communication conduit in communication with the recessed portion 12g1 of the flange 12g which forms a third communication conduit with the rear groove portion 26a3 of the communication groove 26a, and always communicates with the upper portion of the fluid chamber Ro formed with the cup seal 15 with the front groove portion 26a1 of the guide 26 and the annular groove 12d of the cylinder cap 12 via the recessed portion 12g1 and the rear groove portion 26a3.

The diameter of the annular groove 12d provided on the cylinder cap 12 is larger than that of the second cup seal 24 and is formed rearwardly adjacent to the second cup seal 24. The annular groove 12d is tapered in such a manner that the diameter of the outer peripheral wall gradually increases from the rear to the front, and opens towards the inner periphery of the cylinder cap 12 to communicate with the communication groove 26a of the guide 26. The communication bore 12e extends from adjacent the outer periphery of the cylinder cap 12 through the front outer peripheral portion of the annular groove 12d to communicates the annular groove 12d with the annular conduit P3. The communication bore 12e is inclined radially outwardly towards the annular conduit P3. The structure of the communication bore 12e is effective for positioning the reservoir connecting port 11b at a position forward of the guide 26, which improves the assembling work of the brake master cylinder to the vehicle body.

The annular conduit P3 is sealed in a liquid-tight manner between the body 11 and the cylinder cap 12 by the O-ring 13 that is assembled on the front of the cylinder cap 12 to block communication with the first pressure chamber R1 and is sealed in an air-tight and liquid-tight manner between the body 11 and the cylinder cap 12 with the O-ring 14 that is assembled on the rear of the body 11 to block communication with the atmosphere. The diameter of the O-ring 14 is larger than that of the O-ring 13.

The first piston 31 which is made of metal is inserted into the cylinder housing 10 through the cylinder cap 12 and is slidably supported in the axial direction by the sleeve 23 and the guide 26. The first piston 31 is biased in the right direction or rear direction of FIG. 1 by a first spring S1 provided between the second piston 32 and the first piston 31, and a retracting amount of the first piston 31 relative to the second piston 32 (which is also the length of the first spring S1) is defined by a first rod 33, a first retainer 34, and a first spring retainer 35.

The first rod 33 is also made of metal and is integrally assembled as one unit to the right end portion of the first piston 31 via the first retainer 34 so that the first rod 33 moves in the axial direction as one unit with the first piston 31. The first retainer 34 is made of metal and also serves as a spring retainer for the first spring S1. The first retainer 34 is fixedly engaged with the right end portion of the first rod 33 and is fitted into the stepped internal bore portion 31b of the first piston 31 by press fit.

The first spring retainer 35 is made of metal and is positioned between the first spring S1 and the second piston 32. The right end (rear end) of the first spring retainer 35 is detachably connected to a head portion 33a at the left end (forward end) of the first rod 33. The first spring retainer 35 includes a projection 35a on the left end portion extending towards the radially outer direction. The middle part of the projection 35a is also bent towards the axial direction. The projection 35a extends into a large diameter portion of the stepped internal bore 12c of the cylinder cap 12 through the opening portion 23g provided on the sleeve 23, and is positioned opposite to the large stepped portion 12c 2 provided on the stepped internal bore 12c of the cylinder cap 12 at the predetermined interval. The projection 35a is engageable with the large stepped portion 12c2 at the retracting direction of both pistons 31, 32.

The second piston 32 is made of metal and is positioned coaxially with respect to the first piston 31. The second piston 32 is slidably supported in the axial direction by the sleeve 23 in the cylinder housing 10. The second piston 32 is biased in the right direction of FIG. 1 by a second spring S2 that is positioned between the body 11 and the second piston 32, and the retracting amount (which corresponds to the length of the second spring S2) in the right direction of FIG. 1 is defined by a second rod 36, a second retainer 37, and a second spring retainer 38.

The second rod 36 is made of metal and is assembled to the second piston 32 as one unit via the second retainer 37 at the right end portion and moves in the axial direction as one unit with the second piston 32. The second retainer 37 is made of metal and also serves as a spring retainer for the second spring S2. The second retainer 37 is fixedly engaged with the right end portion of the second rod 36 and is positioned in the stepped internal portion 32b of the second piston 32 by press fit.

The second spring retainer 38 is made of metal and is positioned between the second spring S2 and the body 11, with the right end portion of the second spring retainer 38 being positioned opposite to a head portion 36a of the second rod 36 at a predetermined gap. This gap is smaller than the gap between the large stepped portion 12c 2 of the cylinder cap 12 and the projection 35a of the first spring retainer 35. Accordingly, the projection 35a of the first spring retainer 35 is not engaged with the large stepped portion 12c 2 of the cylinder cap 12 until the second spring S2 expands to the length defined by the second rod 36, the second retainer 37, and the second spring retainer 38.

The projection 35a of the first spring retainer 35 contacts the large stepped portion 12c 2 of the cylinder cap 12 when the first piston 31, the second piston 32, the first rod 33, the first retainer 34, the first spring retainer 35, the second rod 36, the second retainer 37 and the second spring retainer 38 are moved to the right as one unit by self-weight such as when the brake master cylinder is carried after assembled as shown in FIG. 1. When the brake master cylinder is assembled to the vehicle body, the positions of the first piston 31 and the second piston 32 are adjusted as the maximum retract ed positions shown in FIG. 1.

In the embodiment of the brake master cylinder having the above-described construction, it is possible to realize improved assembly precision between the guide 26 and the second cup seal 24, the concentricity between the second cup seal 24 and the first piston 31 supported by the guide 26, and the sealing effect between the first piston 31 and the second cup seal 24 since the guide 26 and the second cup seal 24 are coaxially engaged with the stepped internal bore 12c of the cylinder cap 12. Particularly, because the assembling bore diameter of the second cup seal 24 and the guide 26 at the stepped internal bore 12c of the cylinder cap 12 is identical in this embodiment, the bore processing of the cylinder cap 12 can be relatively easily made and the assembling error of the guide 26 and the second cup seal 24 to the cylinder cap internal bore 12c can be reduced to improve the concentricity between the first piston 31 and the second cup seal 24.

Because the small diameter cylindrical portion 23a of the sleeve 23 slidably supporting the first piston 31 and the second piston 32 in the axial direction is coaxially engaged with the stepped internal bore 12c of the cylinder cap 12 in front of the guide 26 and the second cup seal 24 in this embodiment, the assembling precision between the guide 26, the second cup seal 24, and the sleeve 23 can be relatively easily improved to thereby easily improve the sliding capability of the first piston 31 supported by the guide 26 and the sleeve 23.

Also, because the sleeve 23 is inserted into the body and supported by the body 11 and the cylinder cap 12 by screw connection of the cylinder cap 12 and the body 11 at the large diameter cylindrical portion 23b of the sleeve 23 in this embodiment, when the axial length of the sleeve 23 is changed in accordance with the surrounding temperature, the length change does not entirely affect the screw connecting portion of the body 11 and the cylinder cap 12, thus effectively prevent the looseness at the screw connecting portion. Also, the small diameter cylindrical portion 23a of the sleeve 23 and the guide 26 are not engaged, and so an excessive load is not added to the guide 26 and the small diameter cylindrical portion of the sleeve 23 (the portion which has less strength at the sleeve 23) when the cylinder cap 12 is excessively tightened. This makes it possible to adopt a material for the sleeve 23 and the guide 26 having less strength to thereby reduce the manufacturing cost.

In the embodiment of the brake master cylinder having the above-described construction, when the brake master cylinder is assembled to the vehicle body, the brake fluid is filled in the cylinder housing 10, the first piston 31 is moved axially to the left in FIG. 1, and pressure is generated in the first pressure chamber R1 since the communication between the first pressure chamber R1 and the reservoir connecting port 11b is blocked by the piston port 31a of the first piston 31 passing through or being covered by the second cup seal 24.

In this case, pressure is generated in the second pressure chamber R2 since the communication between the second pressure chamber R2 and the reservoir connecting port 11c is blocked by movement of the second piston 32 in the axial direction to the left in FIG. 1 to cause the piston port 32a of the second piston 32 to pass through or be covered by the first cup seal 21. Accordingly, the pressurized fluid is supplied from the first pressure chamber R1 to the output port 11d (the port connected to the wheel cylinder) and the pressurized fluid is supplied from the second pressure chamber R2 to the output port 11e (the port connected to the wheel cylinder) to obtain braking performance.

In this case, the load from the pressure of the first pressure chamber R1 affect on the guide 26 to restrict the rearward movement of the guide 26 by the flange portion 12g of the cylinder cap 12 and the load affects the flange portion 12g of the cylinder cap 12 from the rear end of the guide 26 to be received by the cylinder cap 12.

The flange portion 12g of the cylinder cap 12 extends radially inwardly compared to the outer diameter of the annular cup seal 15 that is assembled to the cylinder cap 12 on the rear side of the guide 26 to provide the air-tight and liquid-tight seal between the cylinder cap 12 and the first piston 31 and is capable of ensuring sufficient contacting area with the rear end of the guide 26. Accordingly, excessive compression of the rear end of the guide 26 and excessive deformation of the internal peripheral portion of the guide 26 can be prevented to ensure the strength of the guide 26. Thus, a less strong and more reasonable type of material can be adopted as the material for the guide 26, thus reducing the manufacturing cost.

Because the flange portion 12g of the cylinder cap 12 is annularly shaped and the inner diameter there of is slightly larger than that of the guide 26, the inner periphery of the flange portion 12g can be arranged not to contact to the outer periphery of the first piston 31. Accordingly, the inner periphery of the flange portion 12g does not require processing that might otherwise be required (i.e., processing such as surface treatment against abrasion of the sliding piston and highly precise bore processing), thus reducing the manufacturing cost.

Because the recessed portion 12g1 (the third communication conduit) in communication with the upper portion of the fluid chamber Ro formed by the cup seal 15 at the rear portion of the guide 26 is provided on the flange portion 12g and the rear groove portion 26a3 and the outer periphery groove portion 26a2 (the fourth communication conduit) communicating the recessed portion 12g1 with the annular groove 12d of the cylinder cap 12 and with the front groove portion 26a1 of the guide 26 are provided on the guide 26, air remaining in the upper portion of the fluid chamber Ro formed by the cup seal 15 can be discharged to the annular groove 12d of the cylinder cap 12 and to the front groove portion 26a1 of the guide 26 through the recessed portion 12g1, the rear groove portion 26a3, and the outer periphery groove portion 26a2.

The guide 26 is formed from phenol plastic and the communication groove 26a comprising the front groove portion 26a1, the outer periphery groove portion 26a2, and the rear groove portion 26a3 is formed simultaneously during molding. The manufacturing process is thus easier and more reasonable compared to a situation in which the communication groove is formed by machining the guide 26 such as with bore processing. By properly selecting the plastic materials, surface treatment against abrasion for the sliding piston is not required, which once again reduces the manufacturing cost.

The first communication conduit including the second spacer 25, the guide 26, and the communication groove 26a is provided rearwardly adjacent the second cup seal 24, and the second communication conduit communicating the first communication conduit with the annular conduit P3 is constructed with the annular groove 12d and the communication bore 12e provided on the cylinder cap 12, the brake fluid flows to the first pressure chamber R1 via the communication bore 12e, the annular groove 12d, and the communication groove 26a provided rearwardly adjacent to the second cup seal 24 when the air relieving is made upon assembling the brake master cylinder to the vehicle body.

The annular groove 12d provided on the cylinder cap 12 has a larger diameter than that of the second cup seal 24 and opens to the inner periphery of the cylinder cap 12 to communicate with the communication groove 26a of the guide 26. Also, the communication bore 12e provided on the cylinder cap 12 is provided from the outer periphery of the cylinder cap 12 to the front outer periphery portion of the annular groove 12d. When air relieving is performed, the brake fluid smoothly and accurately flows through the communication bore 12e and the annular groove 12d of the cylinder cap 12 and the communication groove 26a of the guide 26. Accordingly, air remaining in the communication groove 26a of the guide 26 and the communication bore 12e and the annular groove 12d of the cylinder cap 12 can be completely relieved by the air relieving operation.

Because the communication bore 12e provided on the cylinder cap 12 slopes upwardly or outwardly towards the annular conduit P3 (the conduit communicating with the reservoir connecting port 11b provided at the upper portion of the body 11), when air is mixed with the brake fluid in the communication bore 12e and the annular groove 12d of the cylinder cap 12 and the communication groove 26a of the guide 26, air reaching the annular conduit P3 from the communication groove 26a of the guide 26 through the annular groove 12d and the communication bore 12e of the cylinder cap 12 by buoyancy is discharged to a reservoir (not shown) from the annular conduit P3 through the reservoir connecting port 11b, and does not remain in the brake master cylinder. Accordingly, the preferable performance of the brake master cylinder is maintained.

In this embodiment of the brake master cylinder, the conduit formed on the cylinder cap 12 comprises the annular groove 12d and the communication bore 12e. The annular groove 12d can be easily processed by a lathe and the communication bore 12e can be easily processed by drilling. Because the communication bore 12e is provided towards the front outer peripheral portion of the annular groove 12d and processing precision in the peripheral direction is not required, the manufacturing cost can be reduced.

In this embodiment of the brake master cylinder, the communication groove 26a can be molded as one unit with the guide 26 when plastically molding the guide 26 slidably supporting the fist piston 31 in the axial direction and assembled to the cylinder cap 12 on the rear portion of the second cup seal 24. This reduces the manufacturing cost of the brake master cylinder.

It is to be understood that the length from the internal periphery opening portion of the annular groove 12d provided on the cylinder cap 21 to the back face of the second cup seal 24 can be shortened. Accordingly, when the brake master cylinder is assembled to be used for a vehicle, suction (the performance supplementing the brake fluid into the first pressure chamber R1 through a lip portion of the second cup seal 24) of the brake fluid to the first pressure chamber R1 when the first piston 31 is suddenly returned to the retracted position to bring negative pressure in the first pressure chamber R1 can be favorably achieved to improve the performance of the brake master cylinder.

The outer peripheral wall of the annular groove 12d provided on the cylinder cap 12 is tapered in such a manner that the diameter of the outer peripheral wall gradually increases from the rear side towards the front side. The tapered outer peripheral wall of the annular groove 12d thus demonstrates or exhibits a guiding function to improve the ability to relieve air from the communication groove 26a of the guide 26 and the annular groove 12d of the cylinder cap 12 to the communication bore 12e and fluidity of the brake fluid from the communication bore 12e of the cylinder cap 12 to the communication groove 26a of the guide 26.

In this embodiment of the brake master cylinder, the communication bore 12e and the reservoir connecting port 11b are in communication each other via the annular conduit P3 formed between the cylinder cap 12 and the body 11. As a result, the communication bore 12e provided on the cylinder cap 12 and the reservoir connecting port 11b provided on the body 11 are easily and accurately communicated even when the relative position of the communication bore 12e and the reservoir connecting port 11b is changed in the peripheral direction.

In the embodiment of the present invention having the above-described structure, the O-ring 14 is assembled in the annular groove 11h provided on the body 11 at the rear of the annular conduit P3. Accordingly, it is not required to provide an annular groove for an O-ring (corresponding to the annular groove 11h that receives the O-ring) on the outer periphery of the cylinder cap 12. The outer diameter of the cylinder cap 12 can thus be smaller as compared to the case in which the annular groove for the O-ring is provided on the outer periphery of the cylinder cap 12. That is because when the annular groove for the O-ring is provided on the outer periphery of the cylinder cap 12, sufficient thickness must be provided between the communication bore 12e provided on the cylinder cap 12 and the outer periphery of the cylinder cap. Thus, by virtue of the present invention, size or diameter of the cylinder cap 12 can be reduced to thus also reduce the size and overall weight of the body 11 and the brake master cylinder.

Although the guide 26 is formed from phenol plastic in the foregoing embodiment of the brake master cylinder of this invention, the guide 26 may be formed from other plastic materials or formed from forged metal. Also, although the flange portion 12g of the cylinder cap 12 is annular in this embodiment, the form of the flange portion 12g can be changed and is not limited.

FIG. 3 shows a second embodiment of the brake master cylinder according to the present invention. Features in this embodiment that correspond to those in the first embodiment are designated by like reference numerals, and a detailed description of such features will not be repeated here.

In this embodiment, the annular groove 11g receiving the O-ring 13 is formed on the inner periphery of the body 11 rather than being formed on the outer periphery of the cylinder cap 12. When the cylinder cap 12 is connected to the body 11 with screws, because the outer periphery of each O-ring 13, 14 assembled in the respective annular groove 11g, 11h formed in the body 11 contacts the fixed side of the body 11, it is difficult to bend or twist the O-rings 13, 14 when the O-rings 13, 14 having their inner periphery in contact with the outer periphery of the cylinder cap 12 receives the sliding rotation because the fixing force of the body surpasses the rotation force of the cylinder cap 12. This prevents the deterioration of the sealing function. Accordingly, the effective diameter of each O-ring 13, 14 (particularly, the cross-section of the O-ring 14 blocking communication between the annular conduit P3 and the atmosphere) can be reduced, which leads to a the cost reduction for manufacturing each O-ring 13, 14 and a size reduction in the overall brake master cylinder.

Also, because each O-ring 13, 14 is assembled in the respective annular groove 11g, 11h at the inner peripheral surface of the of the body 11, it is difficult for the O-rings 13, 14 provided between the cylinder cap 12 and the body 11 to bend or twist when the cylinder cap 12 rotates fast. Accordingly, when assembling the cylinder cap 12 to the body 11, it is not necessary to assemble the cylinder cap 12 to the body 11 while slowly rotating the cylinder cap 12, thus shortening the assembling time of the cylinder cap 12 to the body 11 and improving productivity.

Because the communication bore 12e and the reservoir connecting port 11b are in communication via the annular conduit P3 formed between the cylinder cap 12 and the body 11, the communication bore 12e provided on the cylinder cap 12 and the reservoir connecting port 11b provided on the body 11 easily and accurately establish communication even when the relative position of the communication bore 12e and the reservoir connecting port 11b is changed in the peripheral direction.

In the second embodiment of the brake master cylinder shown in FIG. 3, the O-ring 13 blocking communication between the first pressure chamber R1 and the annular conduit P3 and provided between the body 11 and the cylinder cap 12 at the front of the annular conduit P3 and is assembled in the annular groove 11g provided on the body 11. Because the outer diameter of the O-ring 13 is smaller than that of the O-ring 14, bending or twisting is difficult to generate, the O-ring 13 may be assembled in the annular groove 13f provided on the cylinder cap 12 as shown in FIG. 1.

Although the first spacer 22 and the sleeve 23, and the second spacer 25 and the guide 26 are structured as different members in the brake master cylinder of the present invention, the first spacer 22 and the sleeve 23, and the second spacer 25 and the guide 26 can be formed in one unit respectively by molding or machining to form the communication groove 23c and the communication groove 26a1.

Although the annular second spacer 25 (which allows fluid flow in the axial direction at inner and outer periphery and prevents a part of the second cup seal 24 from cutting into or blocking the communication groove 26a of the guide 26 when pressure is generated in the first pressure chamber R1) is provided between the second cup seal 24 and the guide 26, the shape and the structure of the second spacer 25 can be changed, and the second spacer 25 may be omitted. The shape and the structure of the first spacer 22 provided between the first cup seal 21 and the sleeve 23 and the first spacer 22 may also be varied or the spacer may be omitted.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake master cylinder comprising:
   a body having an internal bore open at one end;
   a cylinder cap positioned in the internal bore of the body to form a cylinder housing of the master cylinder;
   a first piston extending into the cylinder housing through the cylinder cap and slidably supported by an annular guide member assembled into the cylinder cap in an axial direction;
   a second piston slidably positioned in the bore of the cylinder housing and coaxial with the first piston; and
   a first seal member providing a liquid-tight seal for a first pressure chamber formed between the first and second pistons and located at a front side of the guide member, the guide member and the first seal member being positioned in and engaging a portion of an internal bore of the cylinder cap, and the portion of the internal bore in which the first seal member and the guide member are positioned being of constant diameter.

2. The brake master cylinder according to claim 1, further comprising:
   a sleeve provided in the internal bore of the cylinder cap at the front side of both the guide member and the first seal member for slidably supporting the first and second pistons in the axial direction, at least a part of the sleeve being positioned into the internal bore of the cylinder cap in coaxial alignment with the internal bore.

3. The brake master cylinder according to claim 2, wherein the sleeve includes an outer periphery and is provided with a stepped portion at a middle portion of the outer periphery to define a smaller diameter portion and a larger diameter portion, the smaller diameter portion being coaxially positioned in the internal bore of the cylinder cap and the larger diameter portion being supported by the body and the cylinder cap by a screw connection between the body and the cylinder cap.

4. The brake master cylinder according to claim 1, further comprising:
   a piston port provided in the first piston for fluid communication with the first pressure chamber at a retracted position of the first piston;
   a first conduit provided at a rear side of the first seal member for fluid communication with the piston port;
   a second conduit provided in the cylinder cap for fluid communication with the first conduit; and
   a reservoir port provided in the body and connected to a reservoir for fluid communication between the reservoir and the second conduit.

5. The brake master cylinder according to claim 1, further comprising:
   a second seal member provided in the cylinder cap at a rear side of the guide member for sealing the cylinder cap and the first piston in an air-tight and liquid-tight manner; and
   a flange portion extending radially inwardly beyond an outer peripheral portion of the second seal member and provided in the cylinder cap between the second seal member and the guide member for restricting movement of the guide member in a retracting direction through contact with the guide member.

6. The brake master cylinder according to claim 5, further comprising:
   a piston port provided in the first piston for fluid communication with the first pressure chamber at a retracted position of the first piston;
   a first conduit provided at a rear side of the first seal member for fluid communication with the piston port;
   a second conduit provided in the cylinder cap for fluid communication with the first conduit; and
   a reservoir port connected to a reservoir and provided in the body for fluid communication between the reservoir and the second conduit.

7. The brake master cylinder according to claim 6, wherein the flange portion possess an annular shape and has an inner diameter larger than an inner diameter of the guide member.

8. The brake master cylinder according to claim 6, further comprising:
   a third conduit provided at a rear side of the flange portion, the third conduit being in fluid communication with a fluid chamber provided in the second seal member, and a fourth conduit provided in the guide member for connecting the third conduit with the first conduit.

9. The brake master cylinder according to claim 8, wherein the fourth conduit is formed by molding and is located at an outer periphery and a rear end surface of the guide member.

10. The bake master cylinder according to claim 9, wherein the guide member is made of resin material.

11. A brake master cylinder comprising:

a body having an internal bore open at one end;

a cylinder cap assembled in the internal bore of the body to form a cylinder housing of the master cylinder;

a first piston positioned in the cylinder housing through the cylinder cap and slidably supported by the cylinder cap in an axial direction in the bore of the cylinder housing;

a second slidably piston positioned in the internal bore of the cylinder housing and coaxial with the first piston;

a first seal member providing a liquid-tight seal for a first pressure chamber formed between the first and second pistons;

a piston port provided in the first piston for fluid communication with the first pressure chamber at a retracted position of the first piston;

a first conduit provided at a rear side of the first seal member for fluid communication with the piston port;

a second conduit provided in the cylinder cap for fluid communication with the first conduit; and a reservoir port provided in the body and connected to a reservoir for fluid communication between the reservoir and the second conduit, the second conduit including a first annular groove having a diameter larger than the outer diameter of the first seal member and formed adjacent the rear side of the first seal member and open to the inner periphery of the cylinder cap for fluid communication with the first conduit and a communication conduit provided from adjacent the outer periphery of the cylinder cap to a front outer periphery of the first annular groove to connect the first annular groove with the reservoir port, the communication conduit being inclined upwardly toward the reservoir port.

12. The brake master cylinder according to claim 11, wherein the first conduit includes a communication groove provided at a front end of a guide member provided at a rear of the first seal member for slidably supporting the first piston in the axial direction.

13. The brake master cylinder according to claim 11, wherein the first annular groove includes a tapered outer periphery gradually increasing in diameter in a forward direction.

14. The brake master cylinder according to claim 11, wherein an annular conduit is provided between the cylinder cap and the body and is positioned between the reservoir port and the second conduit for fluid communication between the reservoir port and the second conduit.

15. A brake master cylinder comprising:

a body having an internal bore provided with an internally threaded portion at an open end of the internal bore;

a cylinder cap positioned in the internal bore of the body to form a cylinder housing of the master cylinder;

a first piston extending into the cylinder housing through the cylinder cap and slidably supported by the cylinder cap in an axial direction in the bore of the cylinder housing;

a second piston slidably positioned in the bore of the cylinder housing and coaxial with the first piston;

a first seal member providing a liquid-tight seal for a first pressure chamber formed between the first and second pistons;

a piston port provided in the first piston for fluid communication with the first pressure chamber at a retracted position of the first piston;

a first conduit provided at a rear side of the first seal member for fluid communication with the piston port;

a second conduit provided in the cylinder cap for fluid communication with the first conduit;

a reservoir port adapted to be connected to a reservoir and provided in the body for fluid communication between the reservoir and the second conduit; and a second seal member provided in a first annular groove formed in the internal bore of the body at a position between the internally threaded portion and the reservoir port for sealing the body and the cylinder cap in an air-tight manner to interrupt communication between the second conduit and atmospheric pressure.

16. The brake master cylinder according to claim 15, further comprising a third seal member provided in a second annular groove in the body at a front side of the reservoir port for sealing the body and the cylinder cap to interrupt fluid communication between the first pressure chamber and the reservoir port.

17. The brake master cylinder according to claim 15, further comprising an annular conduit formed between the cylinder cap and the body and positioned between the second conduit and the reservoir port for providing communication between the second conduit and the reservoir port.

* * * * *